United States Patent [19]

Shin

[11] Patent Number: 5,587,139
[45] Date of Patent: Dec. 24, 1996

[54] HIGH DENSITY NICKEL HYDROXIDE CONTAINING BORON AND A METHOD FOR PREPARING IT

[75] Inventor: Dong-Yup Shin, Kyunki-Do, Rep. of Korea

[73] Assignee: Hyundai Motor Company, Seoul, Rep. of Korea

[21] Appl. No.: 487,440

[22] Filed: Jun. 7, 1995

Related U.S. Application Data

[62] Division of Ser. No. 390,958, Feb. 21, 1995.

[30] Foreign Application Priority Data

May 20, 1994 [KR] Rep. of Korea .................. 94-11024

[51] Int. Cl.$^6$ ............................ C01B 35/00; C01G 53/00
[52] U.S. Cl. ............................................ 423/275; 423/592
[58] Field of Search ...................... 423/266, 275, 423/592; 429/223

[56] References Cited

U.S. PATENT DOCUMENTS

| | | | |
|---|---|---|---|
| 5,023,155 | 6/1991 | Charkey et al. | 429/223 |
| 5,196,281 | 3/1993 | Pensabene et al. | 429/223 |
| 5,200,282 | 4/1993 | Ohnishi et al. | 429/223 |
| 5,281,494 | 1/1994 | Ettel et al. | 423/141 |

*Primary Examiner*—Steven Bos
*Attorney, Agent, or Firm*—Finnegan, Henderson, Farabow, Garrett & Dunner, L.L.P.

[57] ABSTRACT

A powder is provided which may be used for alkali rechargeable batteries and a method for producing it. The powder includes boron containing nickel hydroxide particles having a generally spherical shape. The boron is present in an amount in the range of from 0.5 to 5.0 mol % B.

21 Claims, 2 Drawing Sheets

HIGH DENSITY NICKEL HYDROXIDE CONTAINING BORON AND A METHOD FOR PREPARING IT

This application is a division of application Ser. No. 08/390,958, filed Feb. 21, 1995.

BACKGROUND OF THE INVENTION

1. Field of the Invention

The present invention relates to a high density nickel hydroxide containing boron and a method for preparing it; the invention is particularly useful for alkali rechargeable batteries. According to the process of the invention, factors including pH are controlled while supplying a nickel sulfate solution containing a boron compound, a sodium hydroxide solution and ammonium hydroxide to produce high density nickel hydroxide containing boron.

2. Description of the Related Art

Due to recent developments in the electronics industry, the demand for portable electronics such as wireless phones, camcorders, and portable computers has greatly increased. In accordance with this trend, the demand for batteries has likewise increased. As electronic devices are getting smaller and lighter with increasingly demanding performance requirements, a battery with high energy density and high capacity is needed. In response, great advances in the performance of Ni-Cd and lead acid batteries have been realized. However, as a result of cadmium and lead being known pollutants, environmental concerns have increased regulation on the use of these materials. Therefore, there is a significant need for the development of a pollution free rechargeable battery. An increase in the regulation of vehicle emissions has also increased the need for development of a pollution free vehicle.

Rechargeable batteries which meet these needs include Ni-MH (Metal Hydride) batteries, Ni-Fe batteries and Ni-Zn batteries. These batteries replace the cadmium negative electrode in a conventional Ni-Cd battery with Metal Hydride, Fe and Zn respectively. Since these batteries are pollution free and have higher theoretical capacities than Ni-Cd batteries, they are the current focus of research and development. Recently, a small size Ni-MH battery has been commercialized and is in the initial stages of mass production. However, other batteries have yet to be commercialized. A nickel hydroxide electrode which is used in the conventional Ni-Cd battery is also used as the positive electrode in these rechargeable batteries. The development of high capacity nickel hydroxide electrodes is a key to the future commercialization of these rechargeable batteries. The rechargeable battery using a conventional nickel hydroxide electrode mentioned above has a capacity lower than the capacity of a battery using the new negative electrode materials. In order to develop a high capacity battery resulting from use of the new negative electrode materials, production technology of the active materials must coincide with advances in electrode fabrication technology.

The properties of nickel hydroxide used as an active material in a nickel hydroxide electrode differ depending on the production method. Generally, nickel hydroxide is produced using the neutralization method in which nickel salt and hydroxide salt are mixed and then a small amount of water is added. The precipitate particles are so coarse and their size distribution is so wide (ranging from 1 to hundreds of microns) that it is often only usable after being pulverized. The precipitate's irregular shape and low density render it inappropriate for use in a battery. When it is neutralized in solution, the rate of reaction is so fast that the precipitate is too fine and the density is too low, which requires longer filtering or washing times and increases the adsorption of water on the surface. As a result, it is difficult to load large amounts of active material on an electrode and it is therefore impossible to increase the electrode's capacity.

Nickel hydroxide used for pasted nickel hydroxide electrodes should be spherical, have high density, and have a narrow size distribution. Nickel hydroxide appropriate for a battery should have an apparent density of 1.4–1.7 $g/cm^3$, a tapping density of 1.8–2.1 $g/cm^3$, and a size range of 5–50 µm. Since the paste made with this kind nickel hydroxide has excellent fluidity and uniformity, it is possible to fabricate high capacity and uniform electrodes. The use of this kind of nickel hydroxide also improves the utilization of the active material and discharge capacity of the electrode.

In order to produce high density spherical nickel hydroxide, it should be grown gradually. Nickel ions first form complex ions with ammonia and then neutralize or raise the temperature of the solution, thus reducing and controlling the reaction rate so that nickel hydroxide is gradually precipitated by decomposition of the nickel ammonium complex. Nickel hydroxide precipitated in this manner has a high density, but it is difficult to control the reaction rate and particle size; the fluctuation of the composition and the deviation of the solution's pH during the reaction render its stable and continuous production difficult.

Electrode expansion is known to be the main cause of pasted nickel hydroxide electrode degradation. Such expansion occurs because $\beta$-NiOOH transforms into low density $\gamma$-NiOOH. This expansion breaks down the active material and degrades the conductivity of the electrode, which in turn rapidly decreases cycle life and capacity. The low density $\gamma$-NiOOH is characterized by an unstable crystal structure.

Protons do not transfer easily when high density nickel hydroxide is used. When charging at a constant current, a higher overpotential is needed near the end of the charge. Thee already charged $\beta$-NiOOH is constantly oxidized and transforms into low density $\gamma$-NiOOH having a higher level of oxidation. When the low density $\gamma$-NiOOH is formed, the active material's volume increases, resulting in the expansion of the electrode. As charge and discharge cycles are repeated, the electrode material breaks down due to changes in volume; conductivity significantly deteriorates and capacity abruptly decreases. High rates of charge and discharge exacerbate these problems.

It is reported that additives such as Co, Zn, Cd are effective to prevent formation of low density $\gamma$-NiOOH. Substitution of some of the Ni with these elements causes a distortion of the lattice which increases the mobility of protons during charge and discharge reactions in the positive electrode and decreases overvoltage reactions.

In this invention, by adding boron as an active material which does not substitute for the Ni ions, high density nickel hydroxide containing boron may be continuously produced. Boron is effective to prevent the formation of low density $\gamma$-NiOOH. The specific surface area of nickel hydroxide coprecipitated with boron is increased 2–3 times more than that of pure nickel hydroxide, which is expected to increase the high rate discharge capacity. Furthermore, by adding Co, Zn and Cd as well as boron as active material additives to the nickel sulfate solution, high density nickel hydroxide containing boron and Co, Zn, Cd is produced, thus maximizing utilization of active material and preventing the expansion of the electrode. This method thereby produces a high capacity nickel hydroxide electrode.

Accordingly, it is an object of the present invention to provide a high density nickel hydroxide containing boron and a method for preparing it. The high density nickel hydroxide has excellent quality and may be produced by the continuous supply process of reactants and the continuous overflow of product. The high density nickel hydroxide of the invention is particularly useful for alkali rechargeable batteries.

Additional objects and advantages of the invention will be set forth in part in the description which follows, and in part will be obvious from the description, or may be learned by practice of the invention. The objects and advantages of the invention will be realized and attained by means of the elements and combinations particularly pointed out in the appended claims.

SUMMARY OF THE INVENTION

To achieve the objects and in accordance with the purpose of the invention, as embodied and broadly described herein, the invention is a powder comprised of particles having a generally spherical shape. The powder comprises nickel hydroxide and boron; the boron is present in an amount in the range of from 0.5 to 5.0 mol % B.

The invention is also a method for preparing a boron containing nickel hydroxide powder. The method comprises the steps of mixing a nickel sulfate solution containing a boron compound in a concentration in the range of from 0.05 to 0.5 mol/L with ammonium hydroxide in a premixing vessel to form a nickel ammonium complex. The nickel ammonium complex is then supplied to a reactor along with a solution of sodium hydroxide to form a mixture. The residence time of the mixture in the reactor is selected to form the boron containing nickel hydroxide.

In accordance with a preferred embodiment of the invention, the nickel hydroxide is coprecipitated with the boron.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this specification, illustrate one embodiment of the invention and together with the description, serve to explain the principles of the invention.

(a:×300, b:×3,000)

DETAILED DESCRIPTION OF THE PREFERRED EMBODIMENTS

Figure 1:
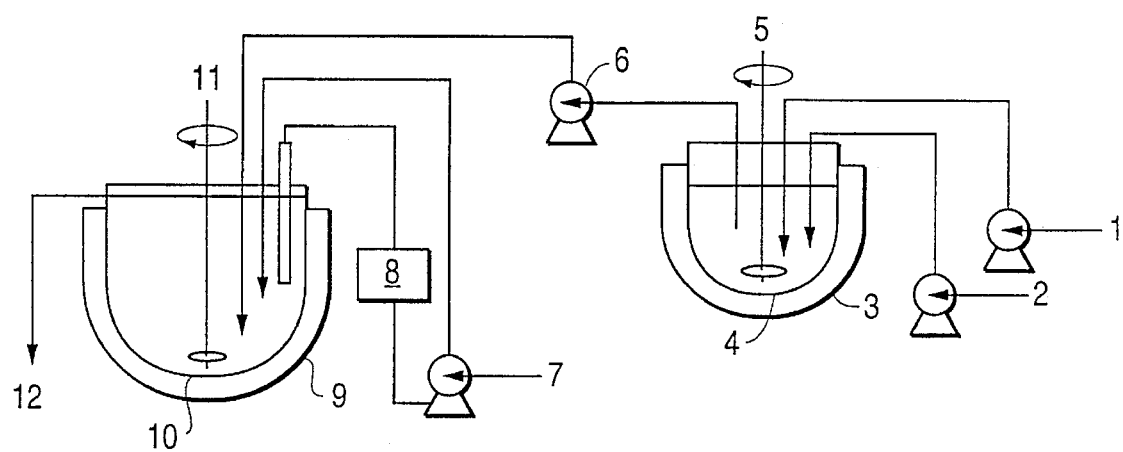
FIG. 1 illustrates a schematic diagram of a nickel hydroxide production apparatus.

FIG. 1 schematically depicts an apparatus used for the continuous production of high density nickel hydroxide containing boron.

As here embodied a nickel sulfate solution supply means 1 containing a boron compound and an ammonium hydroxide supply means 2 continuously supply these materials to a premixing vessel 4 where they are mixed with an agitator 5. The premixing vessel 4 is maintained at a controlled temperature by water bath 3. A mixed solution supply means 6 and a sodium hydroxide supply means 7 supply these materials to reactor 10 and they are mixed with an agitator 11. The reactor 10 is also maintained at a controlled temperature by water bath 9. The sodium hydroxide solution supply means 7 is automatically controlled by pH controller 8. Then the solution and nickel hydroxide are continuously overflowed at 12.

The preferred concentration of boron compound in the nickel sulfate solution is in the range of 0.05–0.5 mol/L.

It is desirable to maintain the temperatures of the premixing vessel 4 and reactor 10 between 35°–90° C. in order to control the reaction rate and stabilize the solutions. When the temperature is lower, ammonium complex salt may be precipitated in the premixing vessel 4 and the reaction rate decreases in the reactor 10. When the temperature is higher, decomposition of ammonia is severe enough to cause the solution to be unstable.

Preferably, the pH of the solution in the reactor 10 should be kept between 9–13 with a variation of ±0.1. Otherwise, the particle are too fine and the density is too low. The residence time of the solution in the reactor is preferred to be about 3 to 12 hours to control the particle size. The residence time is determined by the reactor volume and the flow rate of each solution. The concentration of the nickel sulfate solution is preferably kept between 1.8–2.6 mol/L and the concentration of the ammonium hydroxide is preferably kept between 10.0–16.0 mol/L. The concentration of the sodium hydroxide is preferably kept between 4.0–10.0 mol/L, which is related to the concentration of nickel sulfate solution and affects the properties of nickel hydroxide. The flow rates of the nickel sulfate solution and the ammonium hydroxide are determined by the concentration of each solution and by the mole ratio of mixing –0.04–1.5 mol of ammonia per mol of nickel ion is preferred. When the ratio of mixing is too low, the ammonium complexing effect is negligible, otherwise the reaction rate is reduced to decrease the yield of reaction.

The flow rates of the mixed solution and the sodium hydroxide solution are determined by the residence time which, in turn, is related to the volume of the reactor, the concentration of each solution, and by the mole ratio of premixing. The flow rate of sodium hydroxide is automatically controlled by the pH controller to maintain a fixed pH value when the reaction reaches a steady state condition. The mole ratio of hydroxyl ions is 1.70–2.30 mol per mol of nickel ions, which is determined by the pH.

Co, Zn and Cd used as active material additives may be used, preferably in a concentration of 0.05 to 0.3 mol/L.

The nickel hydroxide produced according to this invention is a high density powder having an apparent density in the range of 1.5–1.7 g/cm$^3$ and a tapping density in the range of 1.9–2.1 g/cm$^3$ It is capable of increasing the loading capacity, maximizing the utilization of active material by coprecipitation with various additives. It is useful as an active material for a nickel hydroxide electrode used in Ni-Cd, Ni-MH, Ni-Fe, and Ni-Zn rechargeable batteries.

The following are illustrative examples of the invention. The invention can be utilized in various ways and is not intended to be confined to the following examples.

EXAMPLE 1

2.2M nickel sulfate solution containing 0.1M boric acid and 15M ammonium hydroxide in a ratio of 0.7 mol ammonia per 1.0M nickel ion were continuously mixed in a premixing vessel at 50° C. The mixed solution and 6.0M sodium hydroxide solution were then continuously fed in a reactor at 50° C. while maintaining the pH at 11. Nickel hydroxide was produced using a residence time of 4 hours. The properties of the nickel hydroxide were:

| Apparent density | 1.59 g/cm$^3$ |
| --- | --- |
| Tap density | 1.90 g/cm$^3$ |
| Particle size | 8–40 μm |
| Water adsorption, after drying | 4.5 wt % |
| Specific surface area | 74.6 m$^2$/g |
| Composition | 1.5 mol % B |

EXAMPLE 2

2.2M nickel sulfate solution containing 0.1M boric acid and 15M ammonium hydroxide in a ratio of 0.6mol ammonia per 1.0M nickel ion were continuously mixed in a premixing vessel at 50° C. The mixed solution and 6.0M sodium hydroxide solution were then continuously fed in a reactor at 50° C. while maintaining the pH at 11.5. Nickel hydroxide was produced using a residence time of 4 hours. The properties of the nickel hydroxide were:

| Apparent density | 1.65 g/cm$^3$ |
| --- | --- |
| Tap density | 2.02 g/cm$^3$ |
| Particle size | 2–45 μm |
| Water adsorption, after drying | 3.8 wt % |
| Specific surface area | 62.1 m$^2$/g |
| Composition | 1.8 mol % B |

EXAMPLE 3

2.2M nickel sulfate solution containing 0.2M boric acid and 15M ammonium hydroxide in a ratio of 0.6 mol ammonia per 1.0M nickel ion were continuously mixed in a premixing vessel at 50° C. The mixed solution and 6.0M sodium hydroxide solution were then continuously fed in a reactor at 50° C. while maintaining the pH at 11.5. Nickel hydroxide was produced using a residence time of 4 hours. The properties of the nickel hydroxide were:

| Apparent density | 1.69 g/cm$^3$ |
| --- | --- |
| Tap density | 2.08 g/cm$^3$ |
| Particle size | 2–45 μm |
| Water adsorption, after drying | 4.3 wt % |
| Specific surface area | 68.2 m$^2$/g |
| Composition | 2.8 mol % B |

EXAMPLE 4

2.2M nickel sulfate solution containing 0.1M boric acid and 0.1M cobalt sulfate and 15M ammonium hydroxide in a ratio of 0.55 mol ammonia per 1.0M nickel ion were continuously mixed in a premixing vessel at 50° C. The mixed solution and 6.0M sodium hydroxide solution were then continuously fed in a reactor at 50° C. while maintaining the pH at 11. Nickel hydroxide was produced using a residence time of 4 hours. The properties of the nickel hydroxide were:

| Apparent density | 1.60 g/cm$^3$ |
| --- | --- |
| Tap density | 1.94 g/cm$^3$ |
| Particle size | 5–50 μm |
| Water adsorption, after drying | 4.8 wt % |
| Specific surface area | 72.1 m$^2$/g |
| Composition | 1.3 mol % B, 4.2 mol % Co |

EXAMPLE 5

2.2M nickel sulfate solution containing 0.1M boric acid and 0.1M zinc sulfate and 15M ammonium hydroxide in a ratio of 0.55 mol ammonia per 1.0M nickel ion were continuously mixed in a premixing vessel at 50° C. The mixed solution and 6.0M sodium hydroxide solution were then continuously fed in a reactor at 50° C. while maintaining the pH at 11. Nickel hydroxide was produced using a residence time of 4 hours. The properties of the nickel hydroxide were:

| Apparent density | 1.62 g/cm$^3$ |
| --- | --- |
| Tap density | 2.05 g/cm$^3$ |
| Particle size | 5–50 μm |
| Water adsorption, after drying | 4.6 wt % |
| Specific surface area | 67.8 m$^2$/g |
| Composition | 1.1 mol % B, 2.3 mol % Zn |

EXAMPLE 6

2.2M nickel sulfate solution containing 0.1M boric acid, 0.1M cobalt sulfate and 0.15M zinc sulfate and 15M ammonium hydroxide in a ratio of 0.5 mol ammonia per 1.0M nickel ion were continuously mixed in a premixing vessel at 50° C. The mixed solution and 6.0M sodium hydroxide solution were then continuously fed in a reactor at 50° C. while maintaining the pH at 11. Nickel hydroxide was produced using a residence time of 4 hours. The properties of the nickel hydroxide were:

| Apparent density | 1.72 g/cm$^3$ |
| --- | --- |
| Tap density | 2.15 g/cm$^3$ |
| Particle size | 2–40 μm |
| Water adsorption, after drying | 4.0 wt % |
| Specific surface area | 69.1 m$^2$/g |
| Composition | 1.2 mol % B, 3.8 mol % Co, 3.1 mol % Zn |

Figure 2B:
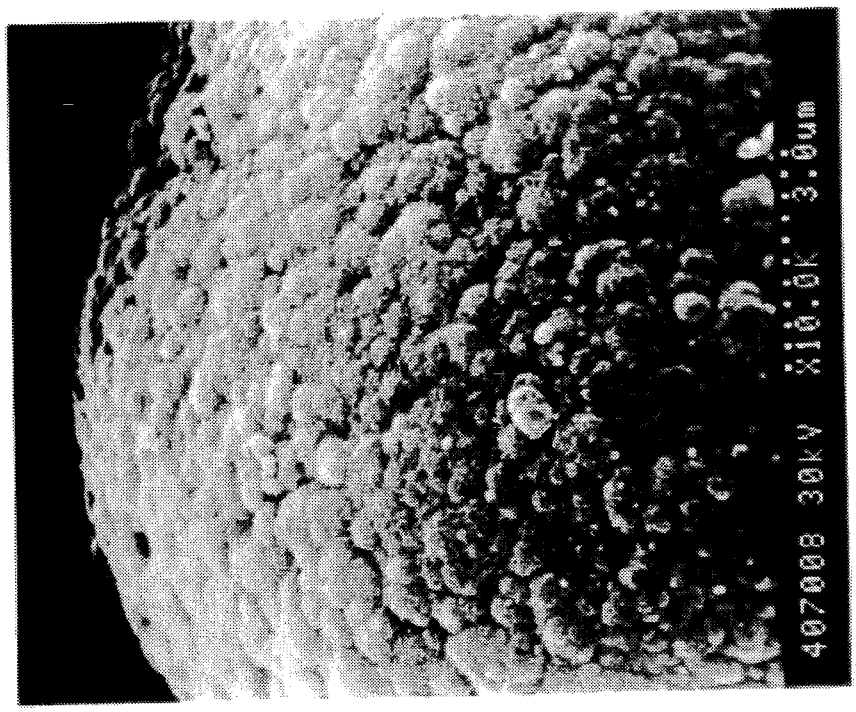
FIG. 2a and FIG. 2b are SEM micrographs of the morphology of nickel hydroxide coprecipitated with boron at steady state conditions.
Figure 2A:
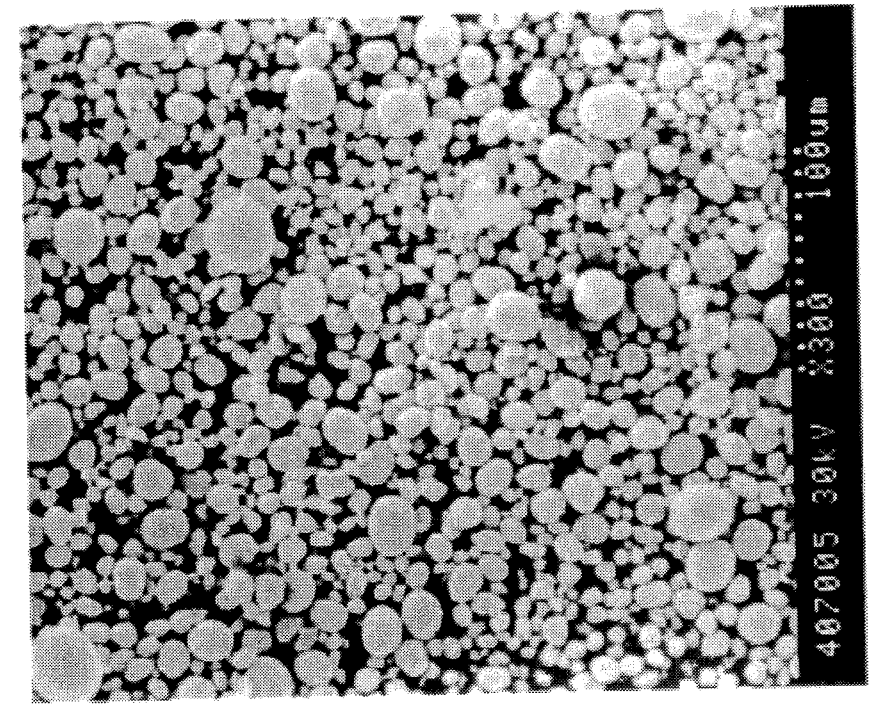

As shown by the above examples, the properties of high density nickel hydroxide containing boron produced according to the invention are superior to those of ordinary nickel hydroxide which typically has the following properties: an apparent density of 0.7–1.3 g/cm$^3$ a tapping density of 1.0–1.7 g/cc, particle sizes ranging from 1 to hundreds of microns, and a specific surface area of 40–80 m$^2$/g. FIGS. 2*a* and 2*b* are micrographs of the nickel hydroxide containing boron according to the invention; note the narrow size distribution and the generally spherical shape.

What is claimed is:

1. A method for preparing a boron containing nickel hydroxide powder, said method comprising the steps of:

mixing a nickel sulfate solution containing a boron compound in a concentration in a range of from 0.05 to 0.5 mol/L with ammonium hydroxide in a premixing vessel to form a nickel ammonium complex;

supplying said nickel ammonium complex to a reactor;

supplying a solution of sodium hydroxide to said reactor to form a mixture; and holding said mixture in said reactor for a time sufficient to form said boron containing nickel hydroxide.

2. The method of claim 1 wherein said nickel sulfate solution further includes one or more of the elements selected from the group consisting of Co, Zn and Cd in a concentration in a range of from 0.05 to 0.3 mol/L.

3. The method of claim 1, including the step of maintaining the complex in the premixing vessel at a temperature in a range of from 35° to 90° C.

4. The method of claim 1, including the step of maintaining the mixture in said reactor at a temperature in a range of from 35° to 90° C.

5. The method of claim 1, including the step of maintaining the mixture in the reactor at a pH in a range of from 9 to 13.

6. The method of claim 1, including the step of maintaining the mixture in the reactor at a pH in the range of from about 9 to 13.

7. The method of claim 1, wherein the holding time of the mixture in the reactor is in a range of from 3 to 12 hours.

8. The method of claim 1, wherein the concentration of nickel in the nickel sulfate solution is in a range of from 1.8 to 2.6 mol/L.

9. The method of claim 1, wherein the concentration of ammonia in the ammonium hydroxide is in a range of from 6.0 to 16 mol/L.

10. The method of claim 1, wherein the concentration of sodium hydroxide is in a range of from 4.0 to 10.0 mol/L.

11. The method of claim 1, wherein mole ratio of nickel sulfate solution and ammonium hydroxide is in a range of from 0.04 to 1.5 mol of ammonia per mol of nickel ion.

12. The method of claim 1, including the step of controlling the flow rate of the sodium hydroxide solution to the reactor by measuring the pH in said reactor once the reaction reaches a steady state condition.

13. The method of claim 1, including the step of controlling the flow rate of the sodium hydroxide solution to the reactor by maintaining the pH at a fixed value when the reaction reaches a steady state condition.

14. The method of claim 13, including the step of maintaining the mole ratio of hydroxyl ion at a value in a range of from 1.70 to 2.30 mol per mol of nickel ion.

15. The method of claim 1, wherein the nickel hydroxide is coprecipitated with the boron.

16. A method for preparing a boron containing nickel hydroxide powder, said method comprising the steps of:

mixing a nickel sulfate solution containing a boron compound in a concentration in a range of from 0.05 to 0.5 mol/L with ammonium hydroxide in a premixing vessel to form a nickel ammonium complex;

maintaining the complex in the premixing vessel at a temperature in a range of from 35° to 90° C.;

supplying said nickel ammonium complex to a reactor;

supplying a solution of sodium hydroxide to said reactor to form a mixture;

maintaining the mixture in the reactor at a pH in a range of from 9 to 13; and holding said mixture in said reactor for a time sufficient to coprecipitate said boron containing nickel hydroxide while maintaining the mixture in said reactor at a temperature in the range of from 35° to 90° C.

17. The method of claim 16 wherein said nickel sulfate solution further includes one or more of the elements selected from the group consisting of Co, Zn and Cd in a concentration in a range of from 0.05 to 0.3 mol/L.

18. The method of claim 16, including the step of maintaining the pH of the mixture in the reactor within 0.1.

19. The method of claim 16, wherein the holding time of the mixture in the reactor is in a range of from 3 to 12 hours.

20. The method of claim 16, including the step of controlling the flow rate of the sodium hydroxide solution to the reactor by maintaining the pH at a fixed value when the reaction reaches a steady state condition.

21. The method of claim 20, including the step of maintaining the mol ratio of hydroxyl ion at a value in a range of from 1.70 to 2.30 mol per mol of nickel ion.

* * * * *